US011021605B2

(12) United States Patent
Theiler et al.

(10) Patent No.: US 11,021,605 B2
(45) Date of Patent: Jun. 1, 2021

(54) VIBRATION COMPONENTS FOR MOTOR VEHICLES

(71) Applicant: LANXESS Deutschland GmbH, Cologne (DE)

(72) Inventors: Stefan Theiler, Neuss (DE); Detlev Joachimi, Krefeld (DE); Thomas Linder, Cologne (DE); Marcel Brandt, Leverkusen (DE); Michael Kuebler, Untergruppenbach (DE)

(73) Assignee: LANXESS Deutschland GmbH, Cologne (DE)

( * ) Notice: Subject to any disclaimer, the term of this patent is extended or adjusted under 35 U.S.C. 154(b) by 107 days.

(21) Appl. No.: 16/239,895

(22) Filed: Jan. 4, 2019

(65) Prior Publication Data
US 2019/0218392 A1    Jul. 18, 2019

(30) Foreign Application Priority Data
Jan. 15, 2018  (EP) .................................... 18151580

(51) Int. Cl.
*B62D 29/04* (2006.01)
*C08L 77/06* (2006.01)
*C08G 69/26* (2006.01)
*C08K 3/04* (2006.01)
*C08K 3/16* (2006.01)
*C08K 13/02* (2006.01)
*C08J 5/04* (2006.01)
*C08K 3/34* (2006.01)
*C08K 5/098* (2006.01)
*B29C 45/00* (2006.01)
*B29K 77/00* (2006.01)
*B29K 509/08* (2006.01)
*B29L 31/30* (2006.01)
*B29L 31/00* (2006.01)

(52) U.S. Cl.
CPC .............. *C08L 77/06* (2013.01); *B62D 29/04* (2013.01); *C08G 69/26* (2013.01); *C08J 5/043* (2013.01); *C08K 3/04* (2013.01); *C08K 3/16* (2013.01); *C08K 3/34* (2013.01); *C08K 5/098* (2013.01); *C08K 13/02* (2013.01); *B29C 45/0001* (2013.01); *B29K 2077/00* (2013.01); *B29K 2509/08* (2013.01); *B29L 2031/30* (2013.01); *B29L 2031/721* (2013.01); *C08J 2377/02* (2013.01); *C08J 2377/06* (2013.01); *C08J 2423/06* (2013.01); *C08J 2477/02* (2013.01); *C08J 2491/06* (2013.01); *C08K 2003/343* (2013.01); *C08L 2201/02* (2013.01); *C08L 2201/08* (2013.01); *C08L 2205/025* (2013.01); *C08L 2205/035* (2013.01); *C08L 2205/06* (2013.01); *C08L 2205/24* (2013.01); *C08L 2310/00* (2013.01)

(58) Field of Classification Search
CPC ......... C08L 77/06; B62D 29/04; C08G 69/26; C08J 5/043; C08K 3/04; C08K 3/16; C08K 5/098; C08K 13/02
USPC ........................................................ 524/279
See application file for complete search history.

(56) References Cited

U.S. PATENT DOCUMENTS

| | | | |
|---|---|---|---|
| 6,139,958 A | 10/2000 | Raghupathi et al. |
| 6,183,637 B1 | 2/2001 | Boyce et al. |
| 6,207,737 B1 | 3/2001 | Schell et al. |
| 6,846,855 B2 | 1/2005 | Campbell et al. |
| 7,419,721 B2 | 9/2008 | Beerda et al. |
| 7,732,047 B2 | 6/2010 | Kashikar et al. |
| 8,347,981 B2 | 1/2013 | Aoki |
| 9,085,075 B2 | 7/2015 | Ikuta |
| 9,321,163 B2 | 4/2016 | Onoda et al. |
| 2018/0105672 A1 | 4/2018 | Benighaus et al. |

FOREIGN PATENT DOCUMENTS

| | | | | |
|---|---|---|---|---|
| CN | 102516761 A | 6/2012 | | |
| CN | 103214834 A | 7/2013 | | |
| CN | 104804415 A | 7/2015 | | |
| DE | 102008004335 A1 | 7/2009 | | |
| DE | 102012021872 A1 | 5/2014 | | |
| EP | 0595123 A1 | 5/1994 | | |
| EP | 1013946 A1 | 6/2000 | | |
| EP | 1041109 A2 * | 10/2000 | ............. | C08K 5/053 |
| EP | 1041109 A2 | 10/2000 | | |
| EP | 2719729 A1 | 4/2014 | | |
| JP | 11152062 A * | 6/1999 | | |
| JP | 11152062 A | 6/1999 | | |
| JP | 2017042889 A2 | 3/2017 | | |

OTHER PUBLICATIONS

Sonsino, Cetin Morris, "Structural Durability—an introduction in the Terminology and Selected Basic Principles" vol. 50, Issue 1-2 (Feb. 2008), pp. 77-90, Abstract.
Translation of www.de.wikipedia.org/wiki/Schwingfestigkeit, obtained from the Internet on Mar. 19, 2019, 8 pages.
Taylor, Guy B., "The Relation of the Viscosity of Nylon Solutions in Formic Acid to Molecular Weight as Determined by End-Group Measurements", Viscosity and Molecular Weight of Nylon, Mar. 1947, E.I. du Pont de Nemours & Company, pp. 635-638.
Translation of www.de.wikipedia.org/wiki/Faser-Kunststoff-Verbund, obtained from the Internet on Mar. 19, 2019, one page.
Monella, Daniela et al, "Vergleichende Untersuchungen zur TeilchengroBenanalyse", Chemie Ingenieur Technik, 72, 3, 2000, Wiley-Vch Verlag GmbH, pp. 273-276.
www.en.wikipedia.org/wiki/Low-cycle_fatigue, obtained from the Internet on Mar. 19, 2019, three pages.

(Continued)

*Primary Examiner* — Kelechi C Egwim
(74) *Attorney, Agent, or Firm* — Nicanor A. Kohncke

(57) ABSTRACT

Motor vehicle components are subjected to continuous vibration during operation of the motor vehicle, and hydrolysis resistant (HR) glass fibres are included in polyamide compositions to improve the operational stability of the components.

15 Claims, 2 Drawing Sheets

(56) References Cited

OTHER PUBLICATIONS

Translation of www.de.wikipedia.org/wiki/Schwingfestigkeit, obtained from the Internet on Mar. 19, 2019, three pages.
Glasfasern, Herstellung and Eigenschaften [Glass Fibres, Production and Properties], R&G Faserverbundwerkstoffe GmbH, Waldenbuch, Jan. 2003 edition, pp. 8.14-8.18.
Kastner, J. et al., "Quantitative Messung von Faserlangen und -verteilung in faserverstärkten Kunststoffteilen mittels µ-Röntgen-Computertomographie" [Quantitative Measurement of Fibre Lengths and Distribution in Fibre-Reinforced Plastics Components by means of µ-X-Ray Computed Tomography], DGZfP [German Society for Non-Destructive Testing] annual meeting 2007—lecture 47, pp. 1-8.
Grellmann, w. et al., Kunststoffprüfung, Hanser Verlag 2005, pp. 169-181.

\* cited by examiner

VIBRATION COMPONENTS FOR MOTOR VEHICLES

The present invention relates to the vibration components, and the inclusion of hydrolysis resistant (HR) glass fibres for improving the operational stability of the vibration components. The vibration components are produced from a polyamide, such as nylon-6,6 (PA 6,6), and are preferably components for use in motor vehicles, especially vibration components for use in the engine space of motor vehicles with an internal combustion engine.

BACKGROUND INFORMATION

Vibration resistance is a term from materials science and refers to the deforming and failure characteristics of materials under cyclical stress. Products that are subjected to cyclical stress over prolonged periods are referred to as vibration components. Vibration resistance to be determined on such vibration components should not be confused with absorption of vibration. Instead, the vibration resistance of components or connecting elements, for example screws, is examined in what is called the Wöhler test=finite-life fatigue strength test, which results in what is called the Wöhler curve=S/N curve. The criteria for assessment of a component as being operationally stable are the attainment of a required lifetime, the reliability of the components of a construction or of the overall system, and the certainty that a component will not fail before the assessed lifetime is attained.

The Wöhler curve is divided into the regions of low-cycle fatigue (elastoplastic stresses with relatively high plastic component, with a lifetime of up to $5 \cdot 10^4$ vibration cycles), high-cycle fatigue (elastoplastic stresses, with a lifetime in the range from $5 \cdot 10^4$ to $5 \cdot 10^6$ vibration cycles) and what is called fatigue strength (macroscopically elastic, microscopically plastic stresses with lifetimes greater than $5 \cdot 10^6$ vibration cycles) (see: C. M. Sonsino, M P Materialprüfung [Materials Testing], 50 (2008), book 1/2, p. 77-90, Carl-Hanser-Verlag).

High-cycle fatigue or operational stability and fatigue strength have a great influence on the design, selection of material and dimensioning of vibration components. For the reliable functioning of a vibration component, it has to sustain all stresses that act thereon in practice and over its entire lifetime—if possible—without lasting damage.

By contrast with static stress, which is determined using material indices such as yield point or tensile strength in a tensile test, in order to ascertain dynamic stress, the vibration component to be examined is subjected to changes in load. There is a drop here in the permissible mechanical stress in the material used for production of the vibration component. A fracture can occur even when the tensile strength has not yet been attained and often even without leaving the linear-elastic region of the stress-strain diagram. A screw that serves to secure an exhaust to a motor vehicle, for example, can fracture owing to the vibrational stress of the vehicle movement without attaining the actual yield point. This effect can be amplified by corrosion and/or changes in temperature.

Dynamic stresses are generally regarded as vibrations. For the construction and dimensioning of a component subject to vibrational stress, it has to be known how many changes in load it withstands before fracturing. This property is investigated in the Wöhler test, standardized according to ISO13003:2003. For this purpose, the test bodies are subjected to cyclical stress with high-frequency pulsators, usually under a sinusoidal stress/time function. The stress can be exerted here, according to the test procedure, by tensile/compressive stress, bending, torsion or transverse shear. Load amplitudes and the stress ratio from lower load to upper load (called the degree of rest) are constant. The experiment runs until defined failure (fracture, partial crack) occurs, or a fixed limiting number of vibration cycles is attained.

The maximum number of load changes for a particular load amplitude can be read off from the Wöhler diagram. It depends on material properties (cyclically strengthening/cyclically weakening), the force or the mechanical stress resulting therefrom and the nature of the stress (pulsating compressive stress, pulsating tensile stress or varying stress). Given equal deflection amplitudes, varying stress causes the greatest damage to a component.

To determine the Wöhler line, various test bodies are tested at various load levels. Every Wöhler test runs until defined failure of the sample (fracture, partial crack) occurs, or a fixed number of vibrations (also called limiting number of vibration cycles) has been withstood. For every Wöhler test, average mechanical stress, maximum mechanical stress and minimum mechanical stress in the cyclical exertion of stress are constant. Between the experiments for the same Wöhler line, either only the average mechanical stress or only the ratio between maximum mechanical stress and minimum mechanical stress is varied.

Typically, in the Wöhler diagram (FIG. 1), the nominal mechanical stress amplitude S is plotted in a linear or logarithmic manner against the logarithm of the sustainable number of vibration cycles. The resultant curved profile is called the Wöhler curve. Because the region of high-cycle fatigue in the log-log plot is a straight line, the term "Wöhler line" has also become established.

Considering an illustrative Wöhler curve in FIG. 1 (source: https://de.wikipedia.org/wiki/Schwingfestigkeit), there are three noticeable regions in the graph that are referred to as low-cycle fatigue K, high-cycle fatigue Z and fatigue strength D:

K in the example of FIG. 1 is the region of low-cycle fatigue below about $10^4$ to $10^5$ vibration cycles. This type of fatigue occurs at high plastic strain amplitudes that lead to early failure. In the case of stress that leads to fracture within one quarter of a vibration cycle, reference is made to static strength, which is also determined by the tensile test. For industrial applications, the low-cycle fatigue region is only of minor significance.

Z in the example of FIG. 1 is the region of high-cycle fatigue or finite-life fatigue strength, also called operational stability, between $10^4$ and, depending on the material, about $2 \cdot 10^6$ vibration cycles, in which the log-log plot of the Wöhler curve runs in a straight line.

D in the example of FIG. 1 is the subsequent region of what is called fatigue strength or long-life fatigue strength. What is disputed, however, is whether there is truly a real fatigue strength, or whether, in the case of very high load cycles, failure occurs even in the case of very small stresses. Since no true fatigue strength exists, the sustainable amplitude at $10^8$ changes in load is usually referred to as fatigue strength. If a component is subject to constant corrosion or greatly elevated temperatures, it is no longer possible to expect there to be a fatigue strength.

A component or assembly is often designed not to have fatigue strength but to be operationally stable. This concerns the range of high-cycle resistance, where only a particular number of changes in load can be sustained between tensile strength and fatigue strength. The number of vibration cycles sustained by a component under operational stress (variable stress amplitudes) before failure can be predicted with the aid of the Wöhler line within the scope of statistical accuracy. For this purpose, the methods of linear damage accumulation according to Palmgren, Langer and Miner are used. At the same time, intensive experimental tests are used to verify the theoretical results. Operational stability is nowadays used in virtually all fields of industry for the purpose of lightweight construction.

Components that are not fatigue-resistant but operationally stable require less material and therefore have a lower mass. A lighter vehicle, for example, has lower fuel consumption and a lighter structure, and allows a higher load capacity. Occasionally, operationally stable design also serves to fulfil the function, since aircraft with fatigue strength would not be able to fly because they would be too heavy.

In reality, the consideration of operational reliability also embraces abrupt and impact stresses and environmental conditions such as temperature, pressure, corrosion, stone chips, precipitation, creeping and ageing of the material. Normally, an operationally stable component is designed only up to a particular vibration or impact amplitude and may fail after this limiting stress has been exceeded. Ideally, a safety-relevant component fails solely through deformation and not through fracture in order to assure residual safety and reduce any risk of accident. For instance, unusual events such as accidents in the testing of components play a major role since these stresses have to be sustained without damage by the operationally stable component.

There is a noticeably large degree of scatter in the measurement results of the Wöhler tests. This results only to a minor degree from shortcomings in the tests, and instead results from diverging material properties within the components. The scatter in the measurement results obeys the extreme value theory of W. Weibull and E. J. Gumbel, specifically the distribution of the smallest strengths of the volume elements (Weibull distribution). The statistical size effect also follows from the extreme value theory: small components on average have a greater fatigue strength than large components of identical material. In the course of studies relating to the present invention, therefore, all studies were conducted on standard specimens in the form of tensile specimens according to EN ISO 527-2 in the freshly injection-moulded state.

Components to be designed with vibration resistance can be found wherever there is cyclical stress. Preferred examples include:
  air conduits, especially intake modules, charger systems, oil circuit in engines, especially oil filter housing, cooling circuit of engines, especially cooling water pipes, expansion tanks, pump housings and impellers, triggered by pulsating internal pressure;
  engines, especially air intake pipes, oil sumps, engine bearings, transmission crossmembers, triggered by inducement of vibration;
  coupling bars, front ends, electronics holders, battery mounts, and various holders positioned in vehicles, triggered by inducement of vibration owing to uneven driving surfaces;
  fittings, especially furniture fittings, door locks, parking brakes, sports articles, triggered by repeated movements;
  domestic appliances, especially kitchen appliances, washing machines, dryers, vacuum cleaners, power tools, drills, hammer drills etc., triggered by inducement of vibrations by the motors that drive these machines.

DE 10 2008 004 335 A1 describes a vibrating drive device for a peeler, in which a rotating drive element directly or indirectly drives a vibration component to a vibrating motion. DE 10 2012 021 872 A1 in turn discloses a device for conducting a shaking test for a vehicle, especially a motor vehicle, comprising a base plate, a vibration inducer supported on the base plate with a vibration component driveable to a vertical vibration.

Also known from DE 10 2016 115 812 A1 is a hammer drill in which a vibration component is connected to a rotation body that vibrates in axial direction as a result of rotation of the rotation body. Power tools or impact tools having incorporated vibration components are known from EP 2 143 530 B1, EP 2 529 892 B1 and EP 2 540 448 B1.

JPH 11 152 062 A2 discloses a motor vehicle front end having "excellent vibration properties" based on a thermoplastic filled with 15% to 50% by weight of glass fibres, wherein the glass fibres have an average length of 1 to 20 mm and thermoplastics proposed are polyolefin-based thermoplastics, polycarbonate, polyestercarbonate, polyester, especially polyethylene terephthalate or polybutylene terephthalate, polyamide, or mixtures of the thermoplastics mentioned. However, there is no statement as to the operational reliability or vibration resistance of the front end. A durable and vibration-resistant connection for securing an accelerator pedal module to the chassis of a motor vehicle is known from DE 198 57 225 A1.

For a while, falling $CO_2$ limits and rising fuel prices and recyclability have been requiring, particularly in the automobile industry, innovations with regard to the efficiency of the vehicles, of reduced fuel consumption and of the materials used. The use of lightweight construction concepts is an inexpensive basic measure for which novel and optimized lightweight materials are required. From the group of plastics, short glass fibre-reinforced polyamide is a frequently used material.

The addition of glass fibres to thermoplastic materials achieves an increase in stiffnesses and strengths with simultaneous reduction in the tendency to creep. There is only a slight increase in the bulk density as a result of addition of glass fibres by comparison with the pure thermoplastic material, and inexpensive mass production by the injection moulding process which permits great freedom of configuration and a high degree of functional integration remains possible. Chemical modifications of the thermoplastics also have the effect of optimizing chemical, thermal and mechanical properties of the composite material obtainable in this way.

Owing to their broad spectrum of use, thermoplastics frequently used as materials for production of components that are subjected to high dynamic stresses over a prolonged period during their lifetime are preferably polyamides, especially semicrystalline polyamides. The cyclic/dynamic failure of polyamide-based products over a prolonged period can generally not be prevented by suitable choice of additives, but merely delayed.

Proceeding from the above-described prior art, the problem addressed by the present invention was that of improving the operational stability of thermally stabilized nylon-6,6-based vibration components, preferably of vibration components in motor vehicles, through the provision of optimized polyamide compositions, wherein the studies of the compositions on test specimens produced by means of injection moulding according to ISO 294-3 in the form of tensile specimens of the 1A type according to EN ISO 527-2 in the freshly injection-moulded state feature particularly high cyclic/dynamic fatigue durability with high numbers of load changes and simultaneously high permissible stress by tensile forces, in that, in the test, at a temperature of 120° C., with an upper load of 65 MPa, at least a number of Wöhler load changes in of $>400 \cdot e^{0.11 \cdot glass\ fibre\ content\ in\ \%\ by\ mass}$ is achieved without occurrence of disadvantages in the thermal stability of the vibration components.

SUMMARY OF THE INVENTION

The solution to the problem and the subject-matter of the present invention is the use of compositions comprising, for every
- A) 100 parts by mass of nylon-6,6,
- B) about 30 to about 160 parts by mass of HR glass fibres made of E glass and having an average diameter in the range of about 9.5 to about 10.5 µm (10+1-0.5 µm) and an average length in the range from about 3 to about 4.5 mm, where the length and diameter of the individual fibres are determined semi-automatically using scanning electron micrographs (SEM) by means of a graphics tablet and computer-assisted data collection, and
- C) about 0.03 to about 0.2 part by mass of at least one metal compound of the metals Cu, Fe, Ce or Mn, for increasing the operational stability of vibration components, preferably of vibration components in motor vehicles, especially of vibration components in the engine space of motor vehicles with an internal combustion engine, with the proviso that the composition may also include not more than about 10 parts by mass of impact modifier, and/or not more than about 10 parts by mass of flow improver, and/or not more than about 10 parts by mass of flame retardancy additive, and/or not more than about 0.5 part by mass of hydrolysed fatty acid, preferably stearate, especially calcium stearate, as demoulding agent, and that the HR glass fibres to be used as component B) are injection-moulded with nylon-6,6 to give flat specimens according to DIN EN ISO 180 1-U of nominal size of about 80 mm·10 mm·4 mm and, after storage in an autoclave at about 130° C./about 2 bar for about 1000 h, in a 1:1 mixture of water and ethylene glycol, have an lzod impact resistance to be determined according to IS0180-1U at 23+1-2° C. of at least about 12 kJ/m².

By way of clarification, it should be noted that the length and diameter figures for component B) in the context of the present invention have been determined on the starting fibres as used for production of compositions for use in accordance with the invention. Particularly the lengths of component B) may have been shifted to shorter average lengths in the vibration component as a result of the effect of mechanical forces in the compounding, injection moulding, blow-moulding or extrusion. By way of clarification, it should also be noted that the scope of the invention includes all definitions and parameters listed, cited in general terms or in areas of preference, in any combination. Cited standards are applicable in the version that was current at the filing date of the present application, unless stated otherwise.

Definitions of Terms

The terms "above", "at" or "about" used in the present description are intended to mean that the quantity or value that follows may be the specific value or a roughly equal value. The expression is intended to convey that similar values lead to results or effects that are equivalent according to the invention and are encompassed by the invention.

In the context of the present invention, "thermally stabilized" means the addition of component C), as a result of which vibration components of the present invention withstand temperatures of up to 140° C. without damage over a period of at least 3000 h.

The nomenclature of the polyamides used in the context of the present application corresponds to the international standard, the first number(s) denoting the number of carbon atoms in the starting diamine and the last number(s) denoting the number of carbon atoms in the dicarboxylic acid. The PA 6,6 for use in accordance with the invention is prepared by polycondensation and elimination of water from hexamethylenediamine (HMD) (CAS No. 124-09-4) and odipic acid (CAS No. 124-04-9); for further information, reference is made to DIN EN ISO 16396-1:2015-05.

The preparation of compositions for use in accordance with the invention for the production of moulding compounds for use in injection moulding, extrusion or for blow-moulding is effected by mixing the individual components A), B) and C) and any further components in at least one mixing unit, preferably a compound, more preferably a co-rotating twin-screw extruder. This mixing operation, also referred to as compounding, affords moulding compounds as intermediates that can be provided for further processing in the form of powders or pellets or in extrudate form. These moulding compounds—also referred to as thermoplastic moulding compounds—may either consist exclusively of components A), B) and C), or optionally contain further components.

DESCRIPTION OF THE EMBODIMENTS

Figure 1:
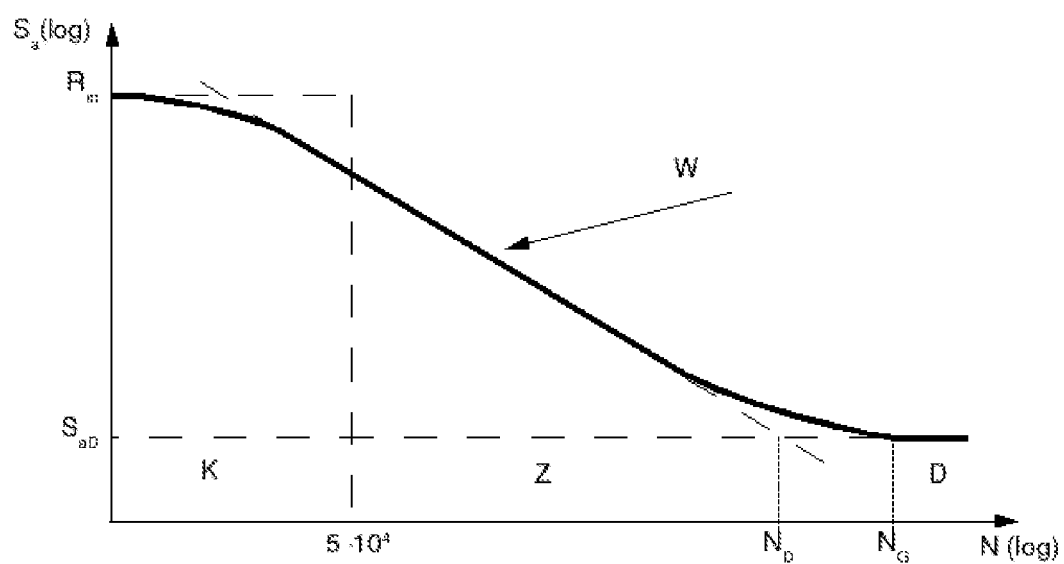
FIG. 1 shows a typical progression of a Wöhler curve for a specimen made of glass fibre-reinforced polyamide (N=number of vibration cycles)

The present invention preferably relates to the use according to the invention of compounds comprising, for every
- A) 100 parts by mass of nylon-6,6,
- B) about 30 to about 160 parts by mass of HR glass fibres made of E glass and having an average diameter in the range of about 10+/−0.5 µm and an average length in the range from about 3 to about 4.5 mm, where the length and diameter of the individual fibres are determined semi-automatically using scanning electron micrographs (SEM) by means of a graphics tablet and computer-assisted data collection,
- C) about 0.03 to about 0.2 part by mass of at least one metal compound of the metals Cu, Fe, Ce or Mn, and
- D) about 0.05 to about 1.0 part by mass of at least one demoulding agent, with the proviso that not more than 10 parts by mass of impact modifier, and/or not more than about 10 parts by mass of flow improver, and/or not more than about 10 parts by mass of flame retardancy additive, and/or not more than about 0.5 part by mass of hydrolysed fatty acid, preferably stearate, especially calcium stearate, as demoulding agent are present, and HR glass fibres to be used as component B) are injection-moulded with nylon-6,6 to give flat specimens according to DIN EN ISO 180 1-U of nominal size of about 80 mm·10 mm·4 mm and, after storage in an autoclave at 130° C./about 2 bar for 1000 h, in a 1:1 mixture of water and ethylene glycol, have an Izod impact resistance to be determined according to ISO180-1 U at 23+/−2° C. of at least about 12 kJ/m².

The present invention preferably relates to the use according to the invention of compounds comprising, for every A) 100 parts by mass of nylon-6,6,
B) about 30 to about 160 parts by mass of HR glass fibres made of E glass and having an average diameter in the range of about 10+/−0.5 μm and an average length in the range from about 3 to about 4.5 mm, where the length and diameter of the individual fibres are determined semi-automatically using scanning electron micrographs (SEM) by means of a graphics tablet and computer-assisted data collection,
C) about 0.03 to about 0.2 part by mass of at least one metal compound of the metals Cu, Fe, Ce or Mn, and
E) about 0.01 to about 5.0 parts by mass of at least one additive from the group of UV stabilizers, pigments, colourants, fillers other than B) and nucleating agents, with the proviso that not more than about 10 parts by mass of impact modifier, and/or not more than about 10 parts by mass of flow improver, and/or not more than about 10 parts by mass of flame retardancy additive, and/or not more than about 0.5 part by mass of hydrolysed fatty acid, preferably stearate, especially calcium stearate, as demoulding agent are present, and HR glass fibres to be used as component B) are injection-moulded with nylon-6,6 to give flat specimens according to DIN EN ISO 180 1-U of nominal size of about 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least about 12 kJ/m².

The present invention preferably relates to the use according to the invention of compounds comprising, for every A) 100 parts by mass of nylon-6,6,
B) about 30 to about 160 parts by mass of HR glass fibres made of E glass and having an average diameter in the range of about 10+/−0.5 μm and an average length in the range from about 3 to about 4.5 mm, where the length and diameter of the individual fibres are determined semi-automatically using scanning electron micrographs (SEM) by means of a graphics tablet and computer-assisted data collection,
C) about 0.03 to about 0.2 part by mass of at least one metal compound of the metals Cu, Fe, Ce or Mn,
D) about 0.05 to about 1.0 part by mass of at least one demoulding agent, and
E) about 0.01 to about 5.0 parts by mass of at least one additive from the group of UV stabilizers, pigments, colourants, fillers other than B) and nucleating agents, with the proviso that not more than about 10 parts by mass of impact modifier, and/or not more than about 10 parts by mass of flow improver, and/or not more than about 10 parts by mass of flame retardancy additive, and/or not more than about 0.5 part by mass of hydrolysed fatty acid, preferably stearate, especially calcium stearate, as demoulding agent are present, and HR glass fibres to be used as component B) are injection-moulded with nylon-6,6 to give flat specimens according to DIN EN ISO 180 1-U of nominal size of about 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least about 12 kJ/m².

The invention also relates to a method of increasing the operational stability of nylon-6,6-based vibration components, preferably of vibration components in motor vehicles, especially of vibration components in the engine space of motor vehicles, by producing them using compositions comprising, for every A) 100 parts by mass of nylon-6,6,
B) about 30 to about 160 parts by mass of HR glass fibres made of E glass and having an average diameter in the range of about 10+/−0.5 μm and an average length in the range from about 3 to about 4.5 mm, where the length and diameter of the individual fibres are determined semi-automatically using scanning electron micrographs (SEM) by means of a graphics tablet and computer-assisted data collection, and
C) about 0.03 to about 0.2 part by mass of at least one metal compound of the metals Cu, Fe, Ce or Mn, by injection moulding, by extrusion, by blow-moulding, or other processing methods, especially by injection moulding, with the proviso that the compositions contain not more than about 10 parts by mass of impact modifier, and/or not more than about 10 parts by mass of flow improver, and/or not more than about 10 parts by mass of flame retardancy additive, and/or not more than about 0.5 part by mass of hydrolysed fatty acid, preferably stearate, especially calcium stearate, as demoulding agent, and HR glass fibres to be used as component B) are injection-moulded with nylon-6,6 to give flat specimens according to DIN EN ISO 180 1-U of nominal size of about 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least about 12 kJ/m².

Component A)

Preference is given to using, as component A), nylon-6,6 having a relative solution viscosity in m-cresol in the range from 2.0 to 4.0. Especially preferably, nylon-6,6 having a relative solution viscosity in m-cresol in the range of 2.3-3.1 is used.

In methods of determining relative solution viscosity, the flow times for a dissolved polymer through an Ubbelohde viscometer are measured, in order then to determine the difference in viscosity between polymer solution and its solvent, in this case m-cresol (1% solution). Applicable standards are DIN 51562; DIN EN ISO 1628 or corresponding standards. In the context of the present invention, the viscosity is measured in sulfuric acid with an Ubbelohde viscometer according to DIN 51562 Part 1 with capillary II at 25° C. (±0.02° C.).

Preferably, the nylon-6,6 for use as component A) has about 20 to about 90 milliequivalents of amino end groups/1 kg of PA and about 20 to about 80 milliequivalents of acid end groups/1 kg of PA, more preferably about 35 to about 80 milliequivalents of amino end groups/1 kg of PA and about 30 to about 75 milliequivalents of acid end groups/1 kg of PA, where PA stands for polyamide. In the context of the present invention, the amino end groups were determined by the following method: G. B. Taylor, J. Am. Chem. Soc. 69, 635, 1947. Nylon-6,6 [CAS No. 32131-17-2] for use as component A) is available, for example, from Radici Chimica S.P.A., Novara, Italy under the Radipol® A45H name or from Solvay Polyamide & Intermediates, Lyons, France under the Stabamid® 24FE2 name.

Component B)

Preference is given to using component B) in amounts of 85 to 160 parts by mass based on 100 parts by mass of component A). Component B) used is HR (=hydrolysis-resistant) glass fibres [CAS No. 65997-17-3] made of E glass according to DIN 1259. According to the brochure Glasfasern, Herstellung and Eigenschaften [Glass Fibres, Production and Properties], R&G Faserverbundwerkstoffe GmbH, Waldenbuch, 01 2003 edition, E glass fibres have a content of $SiO_2$ of 53-55%, of $Al_2O_3$ of 14-15%, of $B_2O_3$ of 6-8%, of CaO of 17-22%, of MgO of <5%, of $K_2O/Na_2O$ of <1%, although other sources differ somewhat from these values. In any case, E glass features a very low alkali content of <1% $Na_2O/K_2O$.

Further characteristics of E glass are typically a density in the range from 2.59 to 2.62 kg/dm$^2$, an elongation at break in the range from 3.5% to 4%, and a modulus of elasticity of 73 GPa. Preferably, these HR glass fibres made of E glass for use as component B) are used in accordance with the invention in polymer compounds that are in contact with glycol/water mixtures at high temperatures, high temperatures being understood by the person skilled in the art in this connection to mean those in the range of cooling water operation temperatures of internal combustion engines, i.e. in the range from 120 to 135° C. Such HR glass fibres made of E glass typically have a coating/size. More particularly such HR glass fibres have been provided with a size based on an organosilane in order to assure hydrolysis stability. By way of example, HR glass fibres are described in U.S. Pat. No. 6,139,958, U.S. Pat. No. 6,183,637, U.S. Pat. No. 6,207,737, U.S. Pat. No. 6,846,855, U.S. Pat. No. 7,419,721 and U.S. Pat. No. 7,732,047, the contents of which are fully encompassed by the present application.

HR glass fibres made of E glass for use as component B) in accordance with the invention are characterized in that they are injection-moulded with nylon-6,6 in an amount of 43 parts by mass based on 100 parts by mass of nylon-6,6 to give flat specimens according to DIN EN ISO 180 1-U of nominal size 80 mm·10 mm·4 mm and, after storage in an autoclave at 130° C./about 2 bar for 1000 h, in a 1:1 mixture of water and ethylene glycol, have an Izod impact resistance to be determined according to IS0180-1U at 23+/−2° C. of at least 12 kJ/m$^2$.

Especially preferably, the Chopvantage® HP3610 (10 μm) glass fibres from PPG Industries, Ohio, or CS 7997 from Lanxess Deutschland GmbH, or E-glass fiber chopped T435TM (ECS10-3.0-T435TM) from Taishan Fiberglass Limited, or DS1128-10N from 3B Fibreglass are used.

Component C)

As thermal stabilizer, compositions for use in accordance with the invention contain, as component C), at least one metal compound of the metals Cu, Fe, Ce or Mn. Component C) is preferably used in amounts in the range from 0.1 to 0.2 part by mass, more preferably in the range from 0.15 to 0.2 part by mass, based in each case on 100 parts by mass of component A). Preference is given in accordance with the invention to copper compounds. Particularly preferred copper compounds are copper halides. Especially preferably, these are used in combination with at least one alkali metal halide or alkaline earth metal halide. Preferred alkali metal halides or alkaline earth metal halides are potassium bromide, potassium iodide, sodium chloride or calcium chloride. Very particular preference is given to using at least copper(I) iodide [CAS No. 7681-65-4] in conjunction with potassium iodide [CAS No. 7681-11-0] or potassium bromide [CAS No. 7758-02-3].

Preferred iron compounds are iron oxide, iron formate or iron oxalate.

A preferred cerium compound is cerium tetrahydroxide.

A preferred manganese compound is manganese chloride.

Component D)

Demoulding agents for use as component D) are preferably ester derivatives or amide derivatives of long-chain fatty acids, especially ethylenebisstearylamide, glycerol tristearate, stearyl stearate, montan ester waxes, especially esters of montanic acids with ethylene glycol and low molecular weight polyethylene or polypropylene waxes in oxidized and non-oxidized form or hydrolysed waxes, compounds of a cation and at least one anion of an aliphatic carboxylic acid, where the anion is obtained by deprotonation of the carboxylic acid, especially calcium stearate.

Preferred demoulding agents belong to the group of esters or amides of saturated or unsaturated aliphatic carboxylic acids having 8 to 40 carbon atoms with saturated aliphatic alcohols or amines having 2 to 40 carbon atoms. Montan ester waxes, also known as montan waxes [CAS No. 8002-53-7] for short, that are preferred for use as demoulding agents, according to manufacturer data, are esters of mixtures of straight-chain, saturated carboxylic acids having chain lengths in the range from 28 to 32 carbon atoms with multifunctional alcohols. Corresponding montan ester waxes are offered for sale, for example, by Clariant International Ltd. as Licowax®. Especially preferred in accordance with the invention is Licowax® E having an acid number to be determined according to ISO 2114 in the range from 15 to 20 mg KOH/g, or a mixture of waxes, preferably mixtures of ester waxes and amide waxes as described in EP 2 607 419 A1.

Preference is given to using component D) in amounts in the range from 0.05 to 1.0 parts by mass in relation to 100 parts by mass of component A).

Component E)

In one embodiment of the present invention, in addition to components B), C) and D), or as an alternative to D), for every 100 parts by mass of component A), 0.01 to 5 parts by mass of additives are also used as component E). Additives for use as component E) are preferably UV stabilizers, dyes or pigments, nucleating agents, or fillers other than B).

UV stabilizers for use as additive in accordance with the invention are preferably substituted resorcinols, salicylates, benzotriazoles or benzophenones.

Dyes or pigments for use as additive in accordance with the invention are preferably carbon black, and also organic pigments, more preferably phthalocyanines, quinacridones, perylenes, and dyes, more preferably nigrosin or anthraquinones, and also other colourants.

Nucleating agents for use as additive in accordance with the invention are preferably sodium phenylphosphinate or calcium phenylphosphinate, aluminium oxide, silicon dioxide or talc. The nucleating used is more preferably talc [CAS No. 14807-96-6], especially microcrystalline talc having a BET surface area to be determined according to DIN ISO 9277 of 5 to 25 m$^2 \cdot$g$^{-1}$.

According to the invention, it is also possible to use further fillers other than B). Preference is given to using at least one filler from the group of carbon fibres [CAS No. 7440-44-0], glass beads, solid or hollow glass beads, especially [CAS No. 65997-17-3], ground glass, amorphous silica [CAS No. 7631-86-9], calcium silicate [CAS No. 1344-95-2], calcium metasilicate [CAS No. 10101-39-0], magnesium carbonate [CAS No. 546-93-0], kaolin [CAS No. 1332-58-7], calcined kaolin [CAS No. 92704-41-1], chalk [CAS No.1317-65-3], kyanite [CAS No. 1302-76-7], powdered or ground quartz [CAS No. 14808-60-7], mica [CAS No. 1318-94-1], phlogopite [CAS No. 12251-00-2], barium sulfate [CAS No. 7727-43-7], feldspar [CAS No. 68476-25-5], wollastonite [CAS No. 13983-17-0] or montmorillonite [CAS No. 67479-91-8].

A "fiber" in the context of the present invention is a macroscopically homogeneous body having a high ratio of length to cross-sectional area. The fiber cross section may be any desired shape but is generally round or oval.

According to "http://de.wikipedia.org/wiki/Faser-Kunststoff-Verbund" a distinction is made between
- chopped fibres, also known as short fibres, having an average length in the range from 0.1 to 5 mm, preferably in the range from 3 to 4.5 mm,
- long fibres having an average length in the range from 5 to 50 mm and
- endless fibres having an average length L >50 mm.

As an alternative to the determination of length and diameter of an individual fibre of component B) in a semiautomatic manner using scanning electron micrographs (SEM), fibre lengths of the fillers for use as component E) can also be determined by micro-focus x-ray computer tomography (μ-CT); J. Kastner et al., Quantitative Messung von Faserlangen und-verteilung in faserverstärkten Kunststoffteilen mittels μ-Röntgen-Computertomographie [Quantitative Measurement of Fibre Lengths and Distribution in Fibre-Reinforced Plastics Components by means of μ-X-Ray Computed Tomography], DGZfP [German Society for Non-Destructive Testing] annual meeting 2007—lecture 47, pages 1-8.

In a preferred embodiment, for better compatibility with component A), the fibrous or particulate fillers for use as component E) have been provided with suitable surface modifications, preferably with surface modifications containing silane compounds, as described above for component B). Cross-sectional area or filament diameter of the fibrous or particulate fillers for use as component E) can be determined by means of at least one optical method according to DIN 65571. Optical methods are a) optical microscope and ocular micrometer (distance measurement cylinder diameter), b) optical microscope and digital camera with subsequent planimetry (cross section measurement), c) laser interferometry and d) projection.

All length, width or diameter figures for the fillers listed under component E) are averaged figures ($d_{50}$) and relate to the state prior to compounding. With regard to the $d_{50}$ values in this application, their determination and their significance, reference is made to Chemie Ingenieur Technik 72, 273-276, 3/2000, Wiley-VCH Verlags GmbH, Weinheim, 2000, according to which the $d_{50}$ is that particle size below which 50% of the amount of particles lie (median).

Especially preferably, the additive or dye used is carbon black or nigrosin.

In the context of the present invention, the compositions for use in accordance with the invention contain not more than 10 parts by mass of impact modifier, or not more than 10 parts by mass of flow improver, or not more than 10 parts by mass of flame retardancy additive—based in each case on 100 parts by mass of nylon-6,6.

In the context of the present invention, impact modifiers, also referred to as elastomer modifiers component F) are preferably copolymers that are preferably formed from at least two monomers from the following group: ethylene, propylene, butadiene, isobutene, isoprene, chloroprene, vinyl acetate, styrene, acrylonitrile and acrylic esters or methacrylic esters having 1 to 18 carbon atoms in the alcohol component. The copolymers may contain compatibilizing groups, preferably maleic anhydride or epoxide.

In the context of the present invention, flow improvers component G) are polyhydric alcohols, preferably polyhydric alcohols having a melting point in the range from 150 to 280° C., preferably 180 to 260° C., where the melting point is an endothermic peak (melting point) measured with a differential scanning calorimetry (DSC) as used for the measurement of the melting point or the solidification point of a polymer. The polyhydric alcohol is preferably pentaerythritol, dipentaerythritol or trimethylolethane. They can be used in combination. Pentaerythritol and/or dipentaerythritol are particularly preferred, especially dipentaerythritol. In this regard, see also EP 1,041,109 A2, the content of which is fully encompassed by the present application.

In the context of the present invention, flame retardancy additives as component H) are mineral flame retardants, nitrogen-containing flame retardants or phosphorus-containing flame retardants.

In the context of the present invention, nitrogen-containing flame retardants are the reaction products of trichlorotriazine, piperazine and morpholine of CAS No. 1078142-02-5, especially MCA PPM Triazine HF from MCA Technologies GmbH, Biel-Benken, Switzerland, melamine cyanurate and condensation products of melamine, especially melem, melam, melon or more highly condensed compounds of this type. In the context of the present invention, inorganic nitrogen-containing compounds are ammonium salts.

In addition, the term "flame retardancy additive" also encompasses salts of aliphatic and aromatic sulfonic acids and mineral flame retardant additives, especially aluminium hydroxide, Ca—Mg carbonate hydrates (in this regard see DE-A 4 236 122).

In addition, compositions for use in accordance with the invention should contain not more than 10 parts by mass—based on 100 parts by mass of nylon-6,6—of flame retardancy additive in the form of flame retardant synergists from the group of the oxygen-, nitrogen- or sulfur-containing metal compounds, especially molybdenum oxide, magnesium oxide, magnesium carbonate, calcium carbonate, calcium oxide, titanium nitride, magnesium nitride, calcium phosphate, calcium borate, magnesium borate or mixtures thereof.

In addition, compositions for use in accordance with the invention should contain not more than 10 parts by mass—based on 100 parts by mass of nylon-6,6—of flame retardancy additive in the form of the following zinc compounds: zinc oxide, zinc borate, zinc stannate, zinc hydroxystannate, zinc sulfide or zinc nitride, or mixtures thereof.

Furthermore, compositions for use in accordance with the invention should contain not more than 10 parts by mass—based on 100 parts by mass of nylon-6,6—of flame retardancy additive in the form of halogenated flame retardants. These are preferably ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ethers, which can be used alone or in combination with synergists, especially antimony trioxide or antimony pentoxide.

Phosphorus-containing flame retardants include organic metal phosphinates, preferably aluminium tris(diethylphosphinate), aluminium phosphonate, red phosphorus, inorganic metal hypophosphites, particularly aluminium hypophosphite, metal phosphonates, especially calcium phosphonate, derivatives of 9,10-dihydro-9-oxa-10-phosphaphenanthrene 10-oxides (DOPO derivatives), resorcinol bis(diphenyl phosphate) (RDP) including oligomers, and bisphenol A bis(diphenyl phosphate) (BDP) including oligomers, and also melamine pyrophosphate, melamine polyphosphate, melamine poly(aluminium phosphate), melamine poly(zinc phosphate) or phenoxyphosphazene oligomers and mixtures thereof.

In addition, compositions for use in accordance with the invention should contain not more than 10 parts by mass—based on 100 parts by mass of nylon-6,6—of flame retardancy additive, where flame retardancy additive refers to charcoal formers, more preferably phenyl-formaldehyde resins, polycarbonates, polyimides, polysulfones, polyether sulfones or polyether ketones, and anti-dripping agents, especially tetrafluoroethylene polymers.

The present invention preferably relates to the inventive use of compositions comprising, for every 100 parts by mass of A) PA 6,6, as component B) 30 to 160 parts by mass of HR glass fibres made from E glass having an average diameter in the range from 9.5 to 10.5 μm and an average length in the range from 3 to 4.5 mm, where the length and diameter of the individual fibres are determined semi-automatically using scanning electron micrographs (SEM) by means of a graphics tablet and computer-assisted data collection, and as component C) 0.03 to 0.2 part by mass of copper(I) iodide/potassium iodide, with the proviso that not more than 10 parts by mass of impact modifier, and/or not more than 10 parts by mass of flow improver, and/or not more than 10 parts by mass of flame retardancy additive, and/or not more than 0.5 part by mass of hydrolysed fatty acid, preferably stearate, especially calcium stearate, as demoulding agent are present, and HR glass fibres to be used as component B) are injection-moulded with nylon-6,6 to give flat specimens according to DIN EN ISO 180 1-U of nominal size 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least 12 kJ/m².

The present invention preferably relates to the inventive use of compositions comprising, for every 100 parts by mass of A) PA 6,6, as component B) 30 to 160 parts by mass of HR glass fibres made from E glass having an average diameter in the range from 9.5 to 10.5 μm and an average length in the range from 3 to 4.5 mm, where the length and diameter of the individual fibres are determined semi-automatically using scanning electron micrographs (SEM) by means of a graphics tablet and computer-assisted data collection, as component C) 0.03 to 0.2 part by mass of copper(I) iodide/potassium iodide, and as component D) 0.05 to 1.0 part by mass of Licowax® E montan ester wax, with the proviso that not more than 10 parts by mass of impact modifier, and/or not more than 10 parts by mass of flow improver, and/or not more than 10 parts by mass of flame retardancy additive, and/or not more than 0.5 part by mass of hydrolysed fatty acid, preferably stearate, especially calcium stearate, as demoulding agent are present, and that HR glass fibres to be used as component B) are injection-moulded with nylon-6,6 to give flat specimens according to DIN EN ISO 180 1-U of nominal size 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least 12 kJ/m².

The present invention preferably relates to the inventive use of compositions comprising, for every 100 parts by mass of A) PA 6,6, as component B) 30 to 160 parts by mass of HR glass fibres made from E glass having an average diameter in the range from 9.5 to 10.5 μm and an average length in the range from 3 to 4.5 mm, where the length and diameter of the individual fibres are determined semi-automatically using scanning electron micrographs (SEM) by means of a graphics tablet and computer-assisted data collection, as component C) 0.03 to 0.2 part by mass of copper(I) iodide/potassium iodide, as component D) 0.05 to 1.0 part by mass of Licowax® E montan ester wax, and as component E) 0.01 to 5 parts by mass of carbon black or nigrosin, with the proviso that not more than 10 parts by mass of impact modifier, and/or not more than 10 parts by mass of flow improver, and/or not more than 10 parts by mass of flame retardancy additive, and/or not more than 0.5 part by mass of hydrolysed fatty acid, preferably stearate, especially calcium stearate, as demoulding agent are present, and that HR glass fibres to be used as component B) are injection-moulded with nylon-6,6 to give flat specimens according to DIN EN ISO 180 1-U of nominal size 80 mm·10 mm·4 mm and, after storage in an autoclave at 130° C./about 2 bar for 1000 h, in a 1:1 mixture of water and ethylene glycol, have an Izod impact resistance to be determined according to ISO180-1U at 23+/−2° C. of at least 12 kJ/m².

Method

The processing of the compositions for use in accordance with the invention is effected in such a way that the individual components are mixed, compounded to give a moulding compound and processed by an injection moulding process, a blow-moulding operation or an extrusion, preferably an injection moulding process, to give the vibration component having the desired geometry.

Preferably, the compositions, directly prior to processing, especially prior to injection moulding, prior to the extrusion or prior to blow-moulding, have a residual moisture content determined by the Karl Fischer method according to DIN EN ISO 15512 of <0.12% by weight—based on 100% by weight of the finished mixture.

Preferably, the mixing is effected in at least one mixing unit. Preferably, the mixing of the components is effected at temperatures in the range from 220 to 350° C. by conjoint blending, mixing, kneading, extruding or rolling. Preferred mixing units should be selected from compounders, co-rotating twin-screw extruders and Buss kneaders. It may be advantageous to premix individual components. A "compound" refers to mixtures of raw materials to which fillers, reinforcers or other additives have additionally been added. Compounding thus combines at least two substances with one another to give a homogeneous mixture. The operation for producing a compound is called compounding.

Preferably, in a first step, at least one of components B) and C), and optionally at least one further component of components D) and E), is mixed with component A) to give a premix.

Preferably, this first step is conducted at temperatures of <50° C. in a mixing unit, preferably in a helical mixer, double-cone mixer, Lodige mixer. Alternatively, premixing in a co-rotating twin-screw extruder, Buss kneader or planetary roll extruder at a temperature above the melting point of component A) (=260° C.) may be advantageous. Preferably, the mixing units are equipped with a degassing function.

After mixing, the moulding compounds obtained are preferably discharged in extrudate form, cooled until pelletizable and pelletized. In one embodiment, the pelletized material obtained is dried, preferably at temperatures in the range from 70 to 130° C., preferably in a dry air dryer. For further processing by injection moulding, the residual moisture content is adjusted to a value of preferably less than 0.12% by weight. For extrusion processing, especially by the blow-moulding method, preference is given to observing a residual moisture content of not more than 0.06% by weight.

The methods of injection moulding, of blow moulding and of extrusion of thermoplastic moulding compounds are known to those skilled in the art. Extrusion and injection moulding processes for processing of the compositions for use in accordance with the invention are preferably conducted at melt temperatures in the range from about 270 to about 330° C., more preferably in the range from 270 to 310° C., most preferably in the range from 280 to 300° C., and, in the case of processing by injection moulding, preferably at injection pressures of not more than about 2500 bar, more preferably at injection pressures of not more than 2000 bar, especially preferably at injection pressures of not more than 1500 bar and very especially at injection pressures of not more than about 750 bar.

The vibration components to be produced from the moulding compounds for use in accordance with the invention are then preferably used in motor vehicles, more preferably in the engine space of internal combustion engines of motor vehicles, where high dynamic durability is required. Alternative possible uses would be in the electrical industry, electronics industry, telecommunications industry, solar industry, information technology industry or computer industry, in the household, in sport, in medicine or in the entertainment industry. For such applications, preference is given to use for mouldings in vehicles, more preferably in motor vehicles, especially in structural components of motor vehicles. Also preferred are domestic applications.

Particular preference is given here to
- air conduits, especially intake modules, charger systems, oil circuit in engines, especially oil filter housing, cooling circuit of engines, especially cooling water pipes, expansion tanks, pump housings and impellers;
- engines, especially air intake pipes, oil sumps, engine bearings, transmission crossmembers; coupling bars, front ends, electronics holders, battery mounts, and various holders positioned in vehicles;
- fittings, especially furniture fittings, door locks, parking brakes, sports articles;
- domestic appliances, especially kitchen appliances, washing machines, dryers, vacuum cleaners, power tools, drills, hammer drills.

Furthermore, the vibration components having improved operational stability may be nylon-6,6-based composite structures and overmoulded nylon-6,6-based composite structures, but also nylon-6,6-based components bonded by weld seams.

Figure 2:
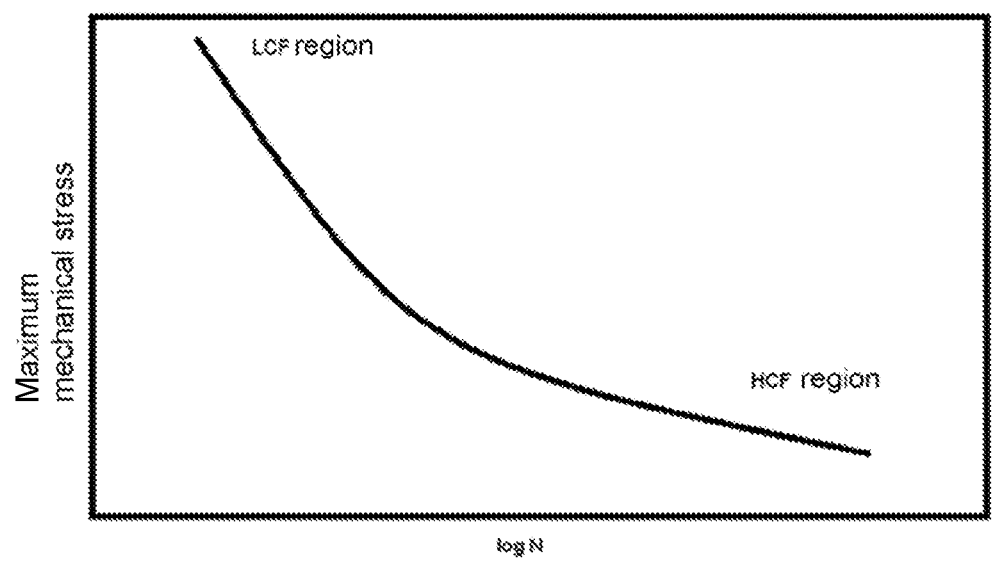
FIG. 2 shows a Wöhler curve showing both the low-cycle fatigue (LCF) region and the high-cycle fatigue (HCF) region.

The figures FIG. 1 and FIG. 2 show the following:

FIG. 1: Typical progression of a Wöhler curve =W for a specimen made of glass fibre-reinforced polyamide (N=number of vibration cycles); source: Wikipedia.

FIG. 2: Wöhler curve showing both the low-cycle fatigue (LCF) region and the high-cycle fatigue (HCF) region; source: Wikipedia.

It will be understood that the specification and examples are illustrative but not limitative of the present invention and that other embodiments within the spirit and scope of the invention will suggest themselves to those skilled in the art.

EXAMPLES

Description of Wöhler test on test specimens

The basis for the assessment of the fatigue characteristics of fibre-reinforced plastics is the sustained vibration test as described in the book Kunststoffprufung W. Grellmann and S. Seidler, Hanser Verlag 2005, p. 169-181. This is done by determining what is called a Wöhler curve in a dynamic-cyclic test. This comprises the plotting of the load levels against the logarithm of the number of vibration cycles at the respective load level. For industrial plastics, the Wöhler curve can be roughly divided into two sections. The first region at higher load levels in a semi-logarithmic plot declines steeply in an approximately linear manner and describes the low-cycle fatigue resistance of the material (LCF region, FIG. 1). The second, flatter part of the curve at lower load levels describes what is called the high-cycle fatigue of the material (HCF region, FIG. 1).

Sustained vibration tests can be conducted both on standard test specimens such as dumbbell specimens or flat specimens and on mouldings, for example "HiAnt beams", which are U-shaped carrier profiles reinforced by cross-ribs.

For the simulation of the static load gradients that normally always also have to be taken into account, the properties of breaking stress and elongation at break that are likewise measured by the tensile test according to DIN EN ISO 527 are likewise taken into account, as is modulus of elasticity at defined temperatures.

In the context of the present invention, tensile specimens of the 1A type according to EN ISO 527-2 are/were examined for their dynamic-cyclic characteristics in a tension-tension fatigue test in the freshly injection-moulded state with a residual moisture content of <0.12% by weight (by the Karl Fischer method according to DIN EN ISO 15512 and based on 100% by weight of the finished mixture) on the basis of compositions for use in accordance with the invention under the test conditions listed below:

Zwick HC10 servohydraulic test machine with temperature control chamber

Ambient temperature (temperature control chamber): 120° C.

Injection-moulded 1A-type tensile test specimens according to DIN EN ISO 527

Conditioning state: freshly injection-moulded

Regulation of force

Test frequency: 10 Hz (sine wave)

Tension-tension fatigue test with a constant 1 MPa lower tension in order to prevent compressive stress and hence buckling of the specimens. By comparison with the comparatively high upper tensions, the result is thus, as a first approximation, a tension ratio R=upper tension/lower tension≈0, Duration of sample preheating to test temperature: 24 h to 36 h.

The following considerations formed the basis for the choice of the test parameters:

- Since the mechanical properties of the polyamide are still changing at first in the course of storage at high temperature, especially as a result of further crystallization processes, further condensation processes, re-drying processes, relaxation processes, the samples are preheated prior to testing for 24 h to 36 h in order to assure robust and reproducible results.
- Since the strength decreases with rising temperature (both in quasi-static and dynamic-cyclic terms), the strength-critical load gradient in the component design is normally at the highest temperature in the specification.
- In the case of structural components, there is typically a temperature requirement in the range from 80° C. to 90° C.; in the case of engine space components, this is frequently even higher (100° C. to 150° C.).
- The chosen test frequency of 10 Hz enables sufficiently rapid testing but nevertheless still allows clean regulation of the sinusoidal force signal desired at high load levels with large distance amplitudes according to the material.

With the chosen 10 Hz, it is possible within a test duration of one day to plot a Wöhler curve that covers both the low-cycle fatigue (LCF) region and the high-cycle fatigue (HCF) region (see FIG. 2) to a sufficient degree, i.e. from « 1000 cycles to » 100 000 cycles.

With regard to LCF see: https://en.wikipedia.org/wiki/Low-cycle_fatigue

With regard to HCF see: https://de.wikipedia.org/wiki/Schwingfestigkeit

FIG. 1: Typical progression of a Wöhler curve for a specimen made of glass fibre-reinforced polyamide (N=number of vibration cycles)

The number of samples tested (typically about 10) also enables sufficiently fine graduation of the load level in order to be able to identify conspicuous test values in the Wöhler curve with sufficient certainty even without multiple testing of a single load level.

For the comparison of the individual materials, in this application, load levels that are within the high-cycle fatigue (HCF) region for Wöhler curves for the respective materials were chosen.

Testing for identification of an HR glass fibre

In order to distinguish an HR glass fibre from a non-HR glass fibre, the test that follows can be used. The fibre to be examined, in an amount of 43 parts by mass based on 100 parts by mass of nylon-6,6 (relative solution viscosity in m-cresol in the range of 2.8-3.2, 35-55 milliequivalents of amino in groups/1 kg of PA and 50-75 milliequivalents of acid end groups/1 kg of PA, e.g. Ultramid® A27E ; from BASF)), were mixed in a ZSK 26 Compounder twin-screw extruder from Coperion Werner & Pfleiderer (Stuttgart, Germany) at a temperature of about 290° C., discharged as a strand into a water bath, cooled until pelletizable and pelletized. The pelletized material is dried down to a residual moisture content of less than 0.12% in a vacuum drying cabinet at 70° C. for about two days and injection-moulded in an SG370-173732 injection-moulding machine from Arburg GmbH & Co. KG to give 10 DIN EN ISO 180 1-U flat specimens of nominal size 80 mm·10 mm·4 mm. The melt temperature is 290° C. and the mould temperature 80° C. These flat specimens are stored in an autoclave (Varioklav Thermo Type 400E) in at least 500 ml of a 1:1 mixture (equal parts by volume) of water and ethylene glycol at 130° C./about 2 bar for 1000 h. After conclusion of the storage time and cooling to room temperature, Izod impact testing is conducted (ISO180-1 U), and compounds with HR glass fibres achieve at least an impact resistance of 12 kJ/m$^2$.

INVENTIVE EXAMPLES

To demonstrate the technical advantages of vibration components to be produced in accordance with the invention, compositions to be used in accordance with the invention were first used to produce moulding compounds in an extruder. Standard test specimens obtained from the moulding compounds by means of injection moulding according to ISO 294-3, in the form of test specimens according to EN ISO 527-2, in the freshly injection-moulded state, were tested in the sustained vibration test at different load levels.

Production of the Polyamide Moulding Compounds

The individual components listed in Tab. 1 were mixed in a ZSK 26 Compounder twin-screw extruder from Coperion Werner & Pfleiderer (Stuttgart, Germany) at temperatures of about 290° C., discharged in extrudate form into a water bath, cooled until pelletizable and pelletized. The pelletized material was dried at 70° C. in the vacuum drying cabinet for about two days down to a residual moisture content of less than 0.12%.

Materials used in the context of the present invention:

Component A1): linear nylon-6,6 (Radipol® A45H from Radici Chimica S.P.A.) having a relative solution viscosity of 3.0 (measured in m-cresol at 25° C.)

Component A2): linear nylon-6,6 (Stabamid® 24FE2 from Solvay Polyamide & Intermediates) having a relative solution viscosity of 2.6 (measured in m-cresol at 25° C.)

Component B1): Chopvantage® HP3610 (diameter 10 µm, average standard length 4.5 mm, made of E glass) from PPG Industries Ohio (HR fibres made from E glass)

Component B2): CS7997 (diameter 10 µm, average standard length 4.5 mm, made of E glass) from LANXESS Deutschland GmbH (HR fibres made from E glass)

Component B3): CS7928 (diameter 11 µm, average standard length 4.5 mm) from LANXESS Deutschland GmbH (E glass, but not an HR fibre according to the invention)

Component C1): copper(I) iodide [CAS No. 7681-65-4], $d_{99}$<70 µm

Component C2): potassium bromide [CAS No. 7758-02-3], $d_{99}$<70 µm

Component D): montan ester wax (Licowax® E, Clariant) [CAS No. 73138-45-1]

Component E): Further additives used for the following components that are in common use in thermoplastic polyamides were:
  Nucleating agent: talc [CAS No. 14807-96-6] in amounts of 0.01 to 1 part by mass
  Carbon black masterbatch: 50% in polyethylene or 30% in nylon-6
  Nigrosin base NB black dye masterbatch (Solvent Black 7) 40%

TABLE 1

Examples and comparison based on PA 6,6 (parts by mass based on 100 parts by mass of PA 6,6)

|  | Ex. 1 | Ex. 2 | Comp. 1 | Ex. 3 | Ex. 4 |
| --- | --- | --- | --- | --- | --- |
| Component A1) | 100.00 |  |  |  |  |
| Component A2) |  | 100.00 | 100.00 | 100.00 | 100.00 |
| Component B1) | 101.03 | 101.03 |  |  | 153.45 |
| Component B2) |  |  |  | 153.45 |  |
| Component B3) |  |  | 153.45 |  |  |
| Component C1) | 0.04 | 0.04 | 0.05 | 0.05 | 0.05 |
| Component C2) | 0.12 | 0.12 | 0.15 | 0.15 | 0.15 |
| Component D) | 0.20 | 0.20 | 0.23 | 0.23 | 0.23 |
| Component E) | 0.67 | 0.67 | 1.87 | 1.87 | 1.87 |

The HR glass fibre content was 50% of the total weight in moulding compounds Ex.1 and Ex. 2, and 60% in moulding compounds Comp.1 and Ex.3 and Ex.4. Since the compositions are based on 100 parts by mass of PA 6,6 and this proportion varies as a result of the different amounts of additions, the different numerical values for the proportions by mass of glass fibres come to rise.

Injection Moulding:

The injection moulding of the moulding compounds obtained was conducted in an Allrounder 470A 1000-170 injection moulding machine from Arburg GmbH & Co. KG. The melt temperature was 290° C. for the PA 6,6-based moulding compounds. The mould temperature was always 80° C. Specimens injection-moulded for the cyclic-dynamic measurements were dumbbell specimens according to DIN EN ISO 527, 1A type.

Testing:

The cyclic-dynamic measurements on tensile specimens in the form of dumbbell specimens according to DIN EN ISO 527, 1A type, were conducted on a Zwick HC10 servohydraulic testing machine at 120° C. Wöhler curves were plotted in accordance with ISO13003:2003.

A measure used for the dynamic-cyclic stress was the number of vibration cycles until failure at an upper tension of 65 MPa for the PA 6,6-based moulding compounds. The results for the different mixtures are listed in Tab. 2.

TABLE 2

Results of the cyclic-dynamic measurements of the examples and comparison based on PA 6,6

|  | Ex. 1 | Ex. 2 | Comp. 1 | Ex. 3 | Ex. 4 |
|---|---|---|---|---|---|
| Changes in load until fracture at 65 MPa | 354334 | 403571 | 146072 | 468619 | 641335 |

The results show that test specimens based on a PA 6,6 composition reinforced with a high content of HR glass fibres (proportion by mass of glass fibres >100) according to Ex. 1, Ex. 2, Ex. 3, and Ex. 4 withstand 3 to 4 times more vibration cycles than a comparative example with a glass fibre which is not characterized as suitable for hydrolysis-resistant applications according to Comp. 1.

What is claimed is:

1. A motor vehicle component, comprising a nylon-6 composition comprising:
   100 parts by mass of nylon-6,6;
   30 to 160 parts by mass of hydrolysis resistant (HR) glass fibres comprising E glass and having an average diameter of 10 +/−0.5 µm, and an average length of 3 to 4.5 mm; and
   0.03 to 0.2 parts by mass of at least one metal compound of the metals Cu, Fe, Ce or Mn,
   wherein the composition may include not more than 10 parts by mass of impact modifier, and/or not more than 10 parts by mass of flow improver, and/or not more than 10 parts by mass of flame retardancy additive, and/or not more than 0.5 part by mass of hydrolysed fatty acid as demoulding agent, and
   wherein the HR glass fibres are injection-moulded with nylon-6,6 to give flat specimens according to DIN EN ISO 180 1-U of nominal size 80 mm ·10 mm ·4 mm, and, after storage in an autoclave at 130° C/about 2 bar for 1000 h, in a 1:1 mixture of water and ethylene glycol, have an Izod impact resistance of at least 12 kJ/m$^2$ determined according to ISO180-1U at 23+/−2° C.

2. The component according to claim 1, further comprising at least one of:
   not more than 10 parts by mass of impact modifier,
   not more than 10 parts by mass of flow improver,
   not more than 10 parts by mass of flame retardancy additive, and
   not more than 0.5 part by mass of hydrolysed fatty acid as demoulding agent.

3. The component according to claim 2, wherein based on 100 parts by mass of the nylon-6,6 there is
   0.05 to 1.0 part by mass of the at least one demoulding agent, and
   0.01 to 5.0 parts by mass of at least one additive from the group of UV stabilizers, pigments, colourants, fillers and nucleating agents, and wherein the at least one metal compound is copper(I) iodide/potassium iodide.

4. The component according to claim 3, wherein the at least one demoulding agent is Licowax® E montan ester wax.

5. The component according to claim 2, wherein based on 100 parts by mass of the nylon-6,6 there is about 0.05 to about 1.0 part by mass of demoulding agent.

6. The component according to claim 5, wherein based on 100 parts by mass of the nylon-6,6 there is about 0.01 to about 5.0 parts by mass of at least one additive from the group of UV stabilizers, pigments, colourants, fillers other than B) and nucleating agents.

7. The component according to claim 2, wherein the hydrolysed fatty acid is stearate.

8. The component according to claim 2, wherein the hydrolysed fatty acid is calcium stearate.

9. The component according to claim 1, wherein the metal compound is selected from the group consisting of: copper halides, iron oxides, iron formats, iron oxalates, cerium tetrahydroxide, and manganese chloride.

10. The component according to claim 9, wherein the copper compounds are present in combination with at least one of alkali metal halides and alkaline earth metal halides.

11. The component according to claim 10, wherein the alkali metal halides and alkaline earth metal halides are potassium bromide, potassium iodide, sodium chloride or calcium chloride.

12. The component according to claim 10, wherein the copper halide is copper(I) iodide and the alkali metal halide is potassium iodide or potassium bromide.

13. The component according to claim 2, wherein:
    the at least one metal compound is copper(I) iodide/potassium iodide, and the hydrolysed fatty acid is calcium stearate.

14. The component according to claim 2, wherein:
    the at least one metal compound is copper(I) iodide/potassium iodide, and the at least one demoulding agent is Licowax® E montan ester wax.

15. The component according to claim 2, wherein:
    the at least one metal compound is copper(I) iodide/potassium iodide, the at least one demoulding agent is Licowax® E montan ester wax, and the at least one additive is carbon black or nigrosin.

* * * * *